United States Patent
Maekawa

(10) Patent No.: US 11,924,586 B2
(45) Date of Patent: Mar. 5, 2024

(54) CONTROL DEVICE, PROGRAM, SYSTEM, AND METHOD

(71) Applicant: HAPSMobile Inc., Tokyo (JP)

(72) Inventor: Naoki Maekawa, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/328,778

(22) Filed: Jun. 5, 2023

(65) Prior Publication Data
US 2023/0308614 A1 Sep. 28, 2023

Related U.S. Application Data

(63) Continuation of application No. PCT/JP2021/040406, filed on Nov. 2, 2021.

(30) Foreign Application Priority Data

Dec. 7, 2020 (JP) ................. 2020-202751

(51) Int. Cl.
*H04N 7/18* (2006.01)
*B64U 10/00* (2023.01)
(Continued)

(52) U.S. Cl.
CPC ............. *H04N 7/185* (2013.01); *B64U 10/00* (2023.01); *G06V 20/17* (2022.01);
(Continued)

(58) Field of Classification Search
CPC ... H04N 7/185; H04N 23/61; H04M 1/72421; G06V 20/17; B64U 10/00; H04W 4/021; H04W 16/28
(Continued)

(56) References Cited

U.S. PATENT DOCUMENTS 10,925,114 B1 * 2/2021 Smith ................. H04B 7/18504
2006/0278757 A1 * 12/2006 Kelleher ............... B64C 39/026
244/63
(Continued)

FOREIGN PATENT DOCUMENTS

JP 2000163673 A 6/2000
JP 2008107941 A 5/2008
(Continued)

OTHER PUBLICATIONS (ISA/237) Written Opinion of the International Search Authority for International Patent Application No. PCT/ JP2021/040406, mailed by the Japan Patent Office dated Feb. 1, 2022.
(Continued)

*Primary Examiner* — Matthew David Kim

(57) ABSTRACT

Provided is a control device including a location information reception unit which receives, via a communication device, location information of a user terminal from the terminal in a wireless communication area, a detection device control unit which controls a detection device of a flying object to detect a state of a region including a location indicated by the location information, a detection information reception unit which receives, via the communication device, detection information indicating the state, an unmanned aerial vehicle control unit which controls an unmanned aerial vehicle to capture an image around the location by an image capturing unit of the vehicle based on the detection information, a captured image reception unit which receives a captured image captured by the image capturing unit from the vehicle, and a rescue method decision unit which decides a rescue method of rescuing a user of the terminal based on the image.

20 Claims, 7 Drawing Sheets

(51) Int. Cl.
  *G06V 20/17* (2022.01)
  *H04M 1/72421* (2021.01)
  *H04N 23/61* (2023.01)
  *H04W 4/021* (2018.01)
  *H04W 16/28* (2009.01)
  *B64U 101/30* (2023.01)
  *B64U 101/55* (2023.01)

(52) U.S. Cl.
  CPC ........ *H04M 1/72421* (2021.01); *H04N 23/61* (2023.01); *H04W 4/021* (2013.01); *H04W 16/28* (2013.01); *B64U 2101/30* (2023.01); *B64U 2101/55* (2023.01)

(58) Field of Classification Search
  USPC .......................................................... 348/144
  See application file for complete search history.

(56) References Cited

U.S. PATENT DOCUMENTS

| | | | | |
|---|---|---|---|---|
| 2011/0298923 | A1* | 12/2011 | Mukae | G08G 1/205 |
| | | | | 348/E7.085 |
| 2012/0062412 | A1 | 3/2012 | Fukunaga | |
| 2012/0261144 | A1 | 10/2012 | Vian | |
| 2017/0127652 | A1* | 5/2017 | Shen | B64C 39/024 |
| 2018/0037321 | A1* | 2/2018 | Wilkinson | F41H 3/00 |
| 2018/0037336 | A1* | 2/2018 | Rammos | B64D 47/06 |
| 2018/0051987 | A1* | 2/2018 | Livens | G01C 11/02 |
| 2018/0346095 | A1* | 12/2018 | Elson | B64F 5/10 |
| 2019/0044470 | A1* | 2/2019 | Schubert | B64G 1/44 |
| 2020/0192989 | A1* | 6/2020 | Ponda | B64C 39/024 |
| 2020/0288532 | A1* | 9/2020 | Wang | G06T 19/00 |
| 2021/0063429 | A1* | 3/2021 | Tucker | G08G 5/0047 |
| 2021/0163134 | A1* | 6/2021 | Hong | G08G 5/0069 |
| 2021/0261144 | A1 | 8/2021 | Kwon | |
| 2022/0166503 | A1* | 5/2022 | Tyner | H04B 10/11 |
| 2022/0179063 | A1* | 6/2022 | Kuki | G01S 13/9021 |

FOREIGN PATENT DOCUMENTS

| | | | |
|---|---|---|---|
| JP | 5767731 | B1 | 8/2015 |
| JP | 2019047467 | A | 3/2019 |
| KR | 20170138225 | A | 12/2017 |
| WO | 2010097921 | A1 | 9/2010 |
| WO | 2018193776 | A1 | 10/2018 |

OTHER PUBLICATIONS

Office Action issued for counterpart Japanese Application No. 2020-202751, issued by the Japanese Patent Office dated May 30, 2023 (drafted on May 29, 2023).

* cited by examiner

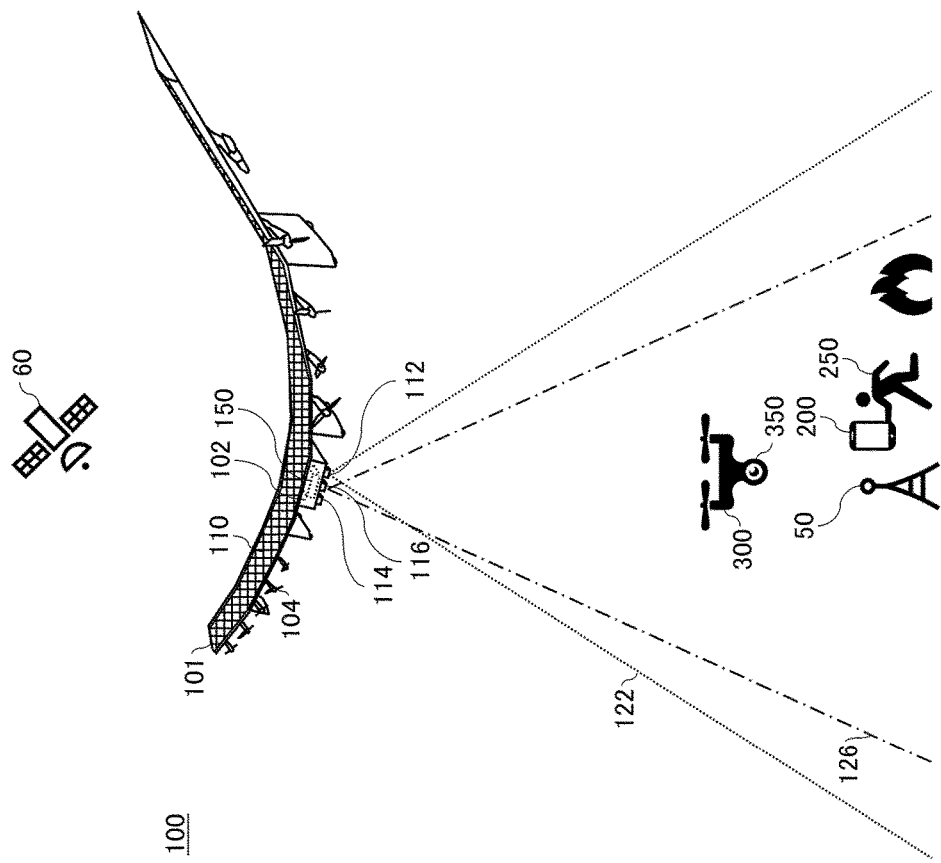
FIG.1

| UNMANNED AERIAL VEHICLE | WAITING LOCATION | PERFORMANCE |
|---|---|---|
| UNMANNED AERIAL VEHICLE A | AIRFIELD a | RGB CAMERA |
| UNMANNED AERIAL VEHICLE B | AIRFIELD a | RGB CAMERA LARGE CAPACITY BATTERY |
| UNMANNED AERIAL VEHICLE C | AIRFIELD a | INFRARED CAMERA |
| UNMANNED AERIAL VEHICLE D | AIRFIELD a | INFRARED CAMERA LARGE CAPACITY BATTERY |
| UNMANNED AERIAL VEHICLE E | AIRFIELD b | RGB CAMERA |
| UNMANNED AERIAL VEHICLE F | AIRFIELD b | RGB CAMERA LARGE CAPACITY BATTERY |
| UNMANNED AERIAL VEHICLE G | AIRFIELD b | INFRARED CAMERA |
| UNMANNED AERIAL VEHICLE H | AIRFIELD b | INFRARED CAMERA LARGE CAPACITY BATTERY |

*FIG.5*

CONTROL DEVICE, PROGRAM, SYSTEM, AND METHOD

The contents of the following patent application(s) are incorporated herein by reference:
NO. 2020-202751 filed in JP on Dec. 7, 2020
NO. PCT/JP2021/040406 filed in WO on Nov. 2, 2021

BACKGROUND

1. Technical Field

The present invention relates to a control device, a program, a system, and a method.

2. Related Art

Patent document 1 describes an air hovering type communication relay device which rapidly secures communication of a terminal device existing in a hazardous district or rapidly improves a communication situation of a terminal device existing in a hazardous district.

LIST OF CITED REFERENCES

Patent Document

Patent Document 1: Japanese Patent Application Publication No. 2019-047467

BRIEF DESCRIPTION OF THE DRAWINGS

FIG. 1 schematically illustrates an example of a system 10.

FIG. 5 schematically illustrates an example of unmanned aerial vehicle information.

DESCRIPTION OF EXEMPLARY EMBODIMENTS

Figure 2:
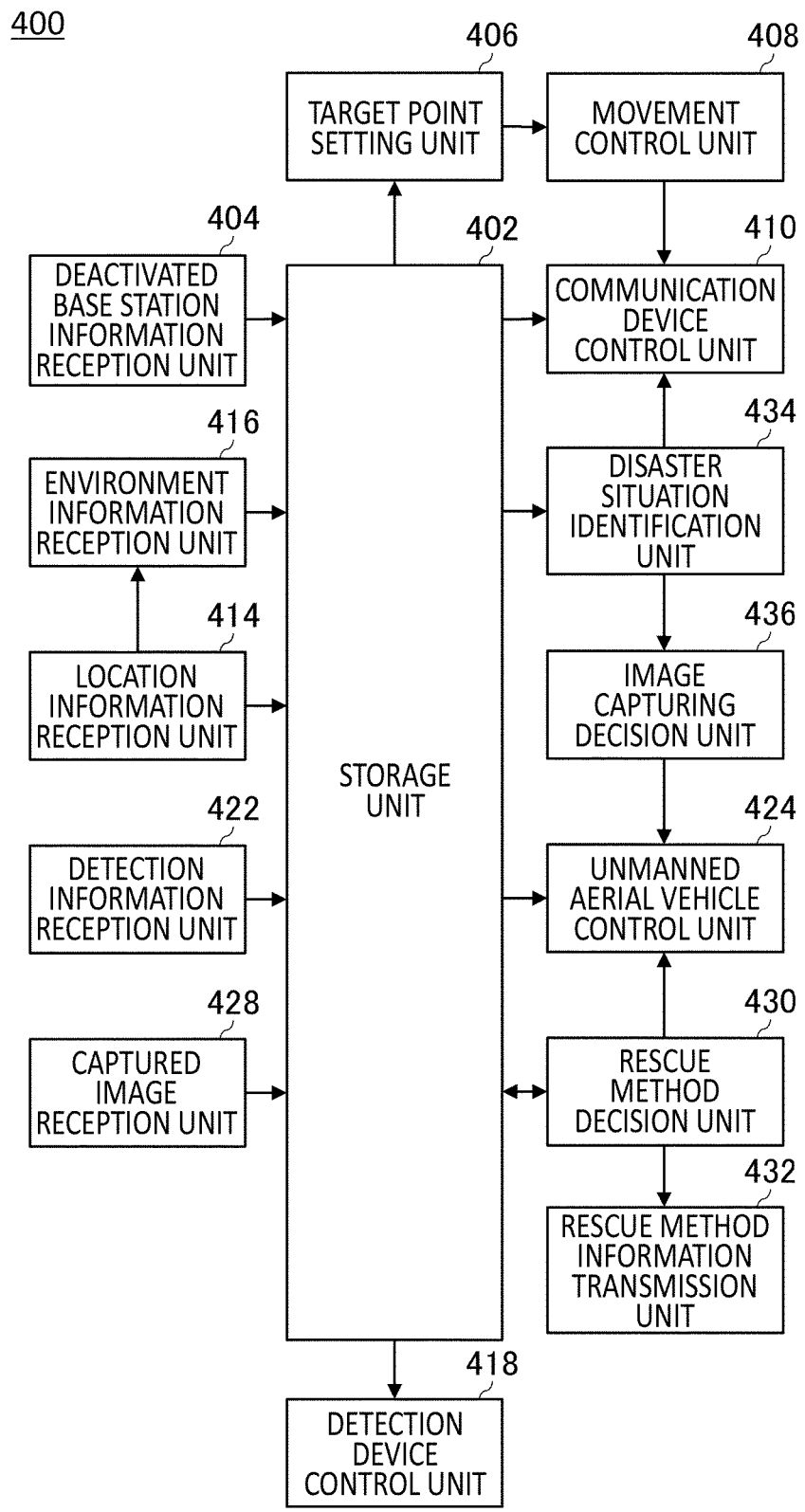
FIG. 2 schematically illustrates an example of a functional configuration of a control device 400.

Exclusively for smartphone users present in a service area under an HAPS (High Altitude Platform Station) dispatched in emergencies for hazard response, a system 10 according to the present embodiment may be able to identify locations of those who need a rescue by regularly aggregating location information of smartphones on a particular server to be shared with emergency agencies via a dedicated application downloaded with consent by the users. A scheme provided by the system 10 can also be applied to a user in a state of being unable to make an emergency call on your own, and a user who is required to inform emergency agencies again of the location information along with move of a primary evacuation site. By using a camera mounted to the HAPS, the system 10 also records a disaster situation in the vicinity of the corresponding location information as video or an image to be provided to the emergency agencies or the like, and also contributes to facilitation of rescue activities.

Hereinafter, the present invention will be described through embodiments of the invention, but the following embodiments do not limit the invention according to claims. In addition, not all of the combinations of features described in the embodiments are essential to the solution of the invention.

FIG. 1 schematically illustrates an example of a system 10. The system 10 according to the present embodiment includes a flying object 100 and a control device 400. The system 10 may include an unmanned aerial vehicle 300. The system 10 may include a radio base station 50. The system 10 may include a gateway 500. The system 10 may include a communication satellite 60. The system 10 may include a user terminal 200.

The system 10 provides a technology contributing to a rescue of a user 250 who possesses the user terminal 200. The user 250 is, for example, a disaster victim in a hazard such as an earthquake or a fire. The user 250 may be a distressed person who is distressed in a mountain, sea, or the like. In particular, the system 10 produces an effect for an area where a wireless communication service by the radio base station 50 on a ground is stopped. In FIG. 1, a case covering a disaster district where the provision of the wireless communication service by the radio base station 50 on the ground is stopped will be mainly described as an example.

The flying object 100 has a main wing portion 101, a main body portion 102, propellers 104, a solar cell panel 110, an antenna 112, an antenna 114, and a detection device 116. The main body portion 102 has a communication device 150, and a battery and a flight control device which are not illustrated in the drawing. The battery stores electric power generated by the solar cell panel 110. The flight control device controls flight of the flying object 100. The flight control device causes the flying object 100 to fly by rotating the propellers 104 using the electric power stored in the battery, for example.

The communication device 150 forms a wireless communication area 122 by irradiation of one or more beams by using the antenna 112 to provide a wireless communication service to the user terminal 200 in the wireless communication area 122. The communication device 150 may establish a service link with the user terminal 200 in the wireless communication area 122 by using the antenna 112. The communication device 150 may establish a feeder link with the gateway 500 on the ground by using the antenna 114. The communication device 150 communicates with the control device 400 via the gateway 500 and a core network 20. The communication device 150 may be integrated with the flight control device.

The core network 20 is provided by a telecommunications carrier. The core network 20 may be compliant with any mobile communication system. The core network is compliant with a 5G (5th Generation) communication system, for example. The core network may be compliant with a mobile communication system of a 6G (6th Generation) communication system onwards. The core network may be compliant with a 3G (3rd Generation) communication system. The core network may be compliant with an LTE (Long Term Evolution) communication system.

When the communication device 150 cannot establish a feeder link with the gateway 500 due to a reason that the gateway 500 is not located in a wireless communication range based on the antenna 114 or the like, the communication device 150 may communicate with the control device 400 through another communication path. For example, the flying object 100 has an antenna for performing wireless communication with another communication device 150 mounted to another flying object 100. By using the antenna, the communication device 150 establishes wireless communication connection with the other communication device 150 which has established the feeder link with the gateway 500. The communication device 150 may communicate with the control device 400 via the feeder link established by the communication device 150 of the other flying object 100. In addition, the flying object 100 may have an antenna for performing wireless communication with the communication satellite 60. By using the antenna, the communication device 150 establishes wireless communication connection with the communication satellite 60. The communication device 150 may communicate with the control device 400 via the communication satellite 60.

The flying object 100 provides the wireless communication service to the user terminal 200 by flying in a stratosphere, for example. The flying object 100 may function as a stratospheric platform.

While circling around in the sky above an area of a coverage objective, for example, the flying object 100 covers the area by the wireless communication area 122. In addition, for example, the flying object 100 covers the entire region by moving in the sky above the area by covering a part of the area of the coverage objective by the wireless communication area 122.

The detection device 116 may be any device as long as the device can detect a state of a detection area 126. The detection device 116 includes, for example, a camera. The camera is, for example, an RGB camera. The camera is, for example, a multi-wavelength spectral camera. The multi-wavelength spectral camera is, for example, a multispectral camera. The multi-wavelength spectral camera may be, for example, a hyperspectral camera. The camera is, for example, an infrared camera. The camera may be a thermal camera. By using the infrared camera and the thermal camera, the flying object 100 can detect the state of the detection area 126 even at night. The camera may be an example of an image capturing device.

The detection device 116 may include an SAR (Synthetic Aperture Radar). The SAR is a sensor which observes a state of the detection area 126 by irradiating an electromagnetic wave that is a millimeter wave or a microwave and observing a reflected wave. The millimeter wave or microwave irradiated by the SAR has a long wavelength in comparison with that of visible light, and can transmit through an obstacle such as a cloud. In addition, the SAR does not require a light source unlike an ordinary optical camera. Thus, by using the SAR, the flying object 100 can detect the state of the detection area 126 even at night.

The user terminal 200 may be any terminal as long as the communication terminal can communicate with the control device 400 via the communication device 150. For example, the user terminal 200 is a mobile phone such as a smartphone, a tablet terminal, a wearable terminal, and the like.

The user terminal 200 has a functionality of acquiring location information of the user terminal 200. The user terminal 200 acquires the location information of the user terminal 200 by using a GNSS (Global Navigation Satellite System) functionality, for example. The user terminal 200 transmits the acquired location information of the user terminal 200 to the control device 400 via the flying object 100.

The user terminal 200 may intermittently transmit the location information of the user terminal 200 to the control device 400. For example, the user terminal 200 transmits the location information of the user terminal 200 in a predetermined cycle to the control device 400. The user terminal 200 may change the cycle of transmitting the location information of the user terminal 200 to the control device 400 according to a remaining battery level of the user terminal 200. For example, as the remaining battery level is lower, the user terminal 200 may increase the cycle of transmitting the location information of the user terminal 200 to the control device 400.

The user terminal 200 may have a functionality of transmitting a rescue signal including the location information of the user terminal 200 to the control device 400. The rescue signal is a signal for requesting a rescue in case of emergency. The rescue signal may include information related to a state of the user 250 such as the presence or absence of an injury. The user terminal 200 transmits the rescue signal to the control device 400 in response to an instruction of the user 250, for example.

The above mentioned functionality of the user terminal 200 may be achieved by an application installed in advance.

The unmanned aerial vehicle 300 has a camera 350. The unmanned aerial vehicle 300 has a battery which is not illustrated in the drawing. The unmanned aerial vehicle 300 flies by using the electric power stored in the battery, for example.

The camera 350 is, for example, an RGB camera. The camera is, for example, a multi-wavelength spectral camera. The multi-wavelength spectral camera is, for example, a multispectral camera. The multi-wavelength spectral camera may be a hyperspectral camera, for example. The camera 350 is, for example, an infrared camera. The camera 350 may be a thermal camera.

The unmanned aerial vehicle 300 may have an antenna for performing wireless communication with the communication device 150 of the flying object 100. The unmanned aerial vehicle 300 establishes a wireless communication connection with the communication device 150 by using the antenna. Thus, the unmanned aerial vehicle 300 can communicate with the control device 400 via the communication device 150. The unmanned aerial vehicle 300 transmits a captured image captured by the camera 350 to the control device 400 via the communication device 150, for example.

The unmanned aerial vehicle 300 may have an antenna for performing wireless communication with the communication satellite 60. The unmanned aerial vehicle 300 establishes a wireless communication connection with the communication satellite 60 by using the antenna. Thus, the unmanned aerial vehicle 300 can communicate with the control device 400 via the communication satellite 60.

The control device 400 controls the flying object 100. The control device 400 controls the unmanned aerial vehicle 300.

The control device 400 controls the flying object 100 to provide a wireless communication service to the user terminal 200, for example. The flying object 100 starts to provide the wireless communication service to the user terminal 200 according to the control by the control device 400. Subsequently, the control device 400 receives the location information of the user terminal 200 from the user terminal 200 via the communication device 150.

The control device 400 controls the detection device 116 of the flying object 100 to detect a state of the detection area 126 including the location indicated by the location information of the user terminal 200 which is received from the user terminal 200, for example. The detection device 116 detects the state of the detection area 126 according to the control of the control device 400. The control device 400 receives, via the communication device 150, detection information indicating the state of the detection area 126 which is detected by the detection device 116.

The control device 400 controls, based on the received detection information, for example, the unmanned aerial vehicle 300 to capture an image around the location indicated by the received location information of the user terminal 200 by the camera 350. The unmanned aerial vehicle 300 moves to the location and captures the image around the location by the camera 350 according to the control of the control device 400 to transmit the captured image to the control device 400.

The control device 400 decides a rescue method of rescuing the user 250 based on the captured image of the camera 350 which is received from the unmanned aerial vehicle 300. The control device 400 transmits rescue method information indicating the decided rescue method to the user terminal 200 via the communication device 150. The control device 400 may transmit the rescue method information to rescue agencies 600 via the core network 20 and an Internet 40.

The control device 400 functions as MEC (Multi-access Edge Computing), for example. That is, the control device 400 may be an MEC server.

The control device 400 is installed on the ground, for example. The control device 400 is installed on the core network 20, for example. Thus, the control device 400 can achieve low latency of the communication with the unmanned aerial vehicle 300, and highly precisely control the unmanned aerial vehicle 300. The control device 400 may be installed on the Internet 40. The control device 400 may be mounted to the flying object 100.

The rescue agencies 600 rescue the user 250 of the user terminal 200 according to the rescue method information received from the control device 400. The rescue agencies 600 rescue the user 250 by dispatching rescue workers, for example. For example, the rescue agencies 600 rescue the user 250 by instructing the rescue workers to transport the user 250 to a safe location. The rescue agencies 600 may rescue the user 250 by instructing the rescue workers to deliver a material.

In a conventional rescue system, in a disaster district where the provision of the wireless communication service by the radio base station on the ground is stopped, when the rescue method is to be decided by taking a state of the disaster district into account, an image of the disaster district has been captured by using a helicopter. Since an image capturing range where an image can be captured by using the helicopter is relatively narrow, it has not been possible to rapidly grasp a state of the entire disaster district when the disaster district spreads in a wide range. In addition, it has not been possible to specifically grasp a state around the disaster victim. In contrast, in accordance with the system 10 according to the present embodiment, even when the disaster district spreads in a wide range, it is possible to rapidly grasp the state of the entire disaster district by the detection device 116 mounted to the flying object 100 functioning as the stratospheric platform. In addition, in accordance with the system 10 according to the present embodiment, by controlling the unmanned aerial vehicle 300 to capture the image around the location indicated by the location information of the user terminal 200 based on the detection information indicating the state of the detection area 126, it is possible to specifically grasp the state around the user 250 of the user terminal 200. In particular, when the detection device 116 detects the disaster district, it is possible to specifically grasp a state of a region the detection of which has been impossible by the detection device 116 as being hidden under a shadow of an obstacle such as a building or the like or a region the specific detection of which has been impossible by the detection device 116 as being affected by rain or the like. Thus, the system 10 according to the present embodiment can more rapidly and appropriately decide the rescue method as compared with the conventional rescue system.

FIG. 2 schematically illustrates an example of a functional configuration of the control device 400. The control device 400 includes a storage unit 402, a deactivated base station information reception unit 404, a target point setting unit 406, a movement control unit 408, a communication device control unit 410, a location information reception unit 414, an environment information reception unit 416, a detection device control unit 418, a detection information reception unit 422, an unmanned aerial vehicle control unit 424, a captured image reception unit 428, a rescue method decision unit 430, a rescue method information transmission unit 432, a disaster situation identification unit 434, and an image capturing decision unit 436. Note that the control device 400 does not necessarily include all of these components.

The storage unit 402 stores various types of information. The storage unit 402 stores unmanned aerial vehicle information related to the unmanned aerial vehicle 300, for example. The unmanned aerial vehicle information includes, for example, information indicating a waiting location of the unmanned aerial vehicle 300. The unmanned aerial vehicle information may include information indicating a performance of the unmanned aerial vehicle 300.

The storage unit 402 may store radio base station information related to the radio base station 50. The radio base station information includes, for example, information indicating a location of the radio base station 50. The radio base station information may include information indicating a range of the coverage objective of the radio base station 50.

The deactivated base station information reception unit 404 receives, from a radio base station management device which manages the radio base station 50, deactivated base station information indicating the radio base station 50 which stops providing the wireless communication service. The deactivated base station information reception unit 404 stores the received deactivated base station information in the storage unit 402.

The target point setting unit 406 sets a target point of movement of the flying object 100. The target point setting unit 406 sets the target point based on the radio base station information and the deactivated base station information which are stored in the storage unit 402, for example.

The target point setting unit 406 sets, as the target point, a point at which the wireless communication area 122 can be formed in the range of the coverage objective of the radio base station 50 which stops providing the wireless communication service, for example. The target point setting unit 406 sets the sky above the radio base station 50 as the target point, for example. When a plurality of radio base stations 50 which stop providing the wireless communication service exist, the target point setting unit 406 may set, as the target point, a point at which the wireless communication area 122 can be formed in a range of the coverage objectives of the plurality of radio base stations 50. The target point setting unit 406 may set, as the target point, the sky above a central location of each location of the plurality of radio base stations 50, for example.

The movement control unit 408 controls the movement of the flying object 100. The movement control unit 408 controls the movement of the flying object 100 such that the flying object 100 moves to the target point set by the target point setting unit 406, for example.

The movement control unit 408 controls the movement of the flying object 100, for example, by generating movement control information for controlling the movement of the flying object 100, and transmitting the movement control information to the flying object 100. The movement control information may be information for controlling at least one of a flight altitude, a flight speed, or a flight direction of the flying object 100, for example.

The communication device control unit 410 controls the communication device 150 of the flying object 100. The communication device control unit 410 causes the communication device 150 to form the wireless communication area 122 in response to arrival of the flying object 100 to the target point set by the movement control unit 408, for example. The communication device control unit 410 controls the communication device 150, for example, by generating communication control information for controlling the communication device 150, and transmitting the communication control information to the flying object 100. The communication control information may be, for example, information for controlling a range of the beam irradiated by the antenna 112.

The communication device control unit 410 controls the communication device 150 based on the radio base station information and the deactivated base station information which are stored in the storage unit 402, for example. For example, the communication device control unit 410 controls the communication device 150 to form the wireless communication area 122 in a range of the coverage objective of the radio base station 50 which stops providing the wireless communication service. When a plurality of radio base stations 50 which stop providing the wireless communication service exist, the communication device control unit 410 may control the communication device 150 to form the wireless communication area 122 in a range of the coverage objectives of the plurality of radio base stations 50.

The location information reception unit 414 receives the location information of the user terminal 200 from the user terminal 200 via the communication device 150 of the flying object 100. The location information reception unit 414 stores the received location information of the user terminal 200 in the storage unit 402. The location information reception unit 414 may receive the rescue signal from the user terminal 200. The location information reception unit 414 stores, in the storage unit 402, the location information of the user terminal 200 which is included in the received rescue signal.

The environment information reception unit 416 receives environment information from an environment information management device which manages environment information related to an environment at any spot. The environment information reception unit 416 stores the received environment information in the storage unit 402.

The environment information includes, for example, hazard information related to a hazard. The hazard information includes, for example, disaster area information indicating a disaster area. The hazard information may include a hazard map. The environment information may include weather information. The weather information includes at least one of a rainfall, a snowfall, a wind speed, a wind direction, or a temperature.

The environment information reception unit 416 receives, for example, the environment information of the location indicated by the location information of the user terminal 200 which is received by the location information reception unit 414. The environment information reception unit 416 may receive environment information of a location of the radio base station 50.

The target point setting unit 406 may set the target point based on the radio base station information stored in the storage unit 402 and the environment information of the location of the radio base station 50. For example, the target point setting unit 406 identifies the devastated radio base station 50 from the disaster area information, and sets, as the target point, a point at which the wireless communication area 122 can be formed in a range of a coverage objective of the identified radio base station 50. The target point setting unit 406 may predict the radio base station 50 which is to be devastated from the hazard map and weather information, and set, as the target point, a point at which the wireless communication area 122 can be formed in a range of a coverage objective of the predicted radio base station 50.

The detection device control unit 418 controls the detection device 116 of the flying object 100. The detection device control unit 418 controls the detection device 116, for example, by generating detection device control information for controlling the detection device 116, and transmitting the detection device control information to the flying object 100.

The detection device control unit 418 controls the detection device 116 based on the location information of the user terminal 200 which is received by the location information reception unit 414, for example. The detection device control unit 418 controls the detection device 116 to detect the detection area 126 including the location indicated by the location information of the user terminal 200, for example. The detection device control unit 418 controls the image capturing device to capture an image of the detection area 126, for example. The detection device control unit 418 may control the SAR to detect a state of the detection area 126.

Detection control information may be, for example, information for controlling at least one of pan, tilt, or zoom of the camera mounted to the flying object 100. The detection control information may be information for controlling an irradiation location of the electromagnetic wave to be irradiated by the SAR mounted to the flying object 100.

The detection information reception unit 422 receives detection information indicating the state of the detection area 126 which is detected by the detection device 116 via the communication device 150. The detection information includes the captured image of the detection area 126 which is captured by the image capturing device, for example. The detection information may include information indicating the state of the detection area 126 which is detected by the SAR. The detection information reception unit 422 stores the received detection information in the storage unit 402.

The unmanned aerial vehicle control unit 424 controls the unmanned aerial vehicle 300. The unmanned aerial vehicle control unit 424 selects the unmanned aerial vehicle 300 to be controlled based on the unmanned aerial vehicle information stored in the storage unit 402 and the location information of the user terminal 200, for example.

The unmanned aerial vehicle control unit 424 controls the movement of the unmanned aerial vehicle 300, for example. The unmanned aerial vehicle control unit 424 controls the camera 350 of the unmanned aerial vehicle 300, for example.

The unmanned aerial vehicle control unit 424 controls the unmanned aerial vehicle 300, for example, by generating unmanned aerial vehicle control information for controlling the unmanned aerial vehicle 300, and transmitting the unmanned aerial vehicle control information for controlling the unmanned aerial vehicle 300 to the unmanned aerial vehicle 300. The unmanned aerial vehicle control information may be information for controlling at least one of a flight altitude, a flight speed, or a flight direction of the unmanned aerial vehicle 300, for example. The unmanned aerial vehicle control information may be, for example, information for controlling at least one of pan, tilt, or zoom of the camera 350.

The unmanned aerial vehicle control unit 424 controls the unmanned aerial vehicle 300 to capture the image around the location indicated by the location information of the user terminal 200 by the camera 350 based on the detection information received by the detection information reception unit 422, for example. For example, the unmanned aerial vehicle control unit 424 identifies a specific detection region which is required to be specifically detected by analyzing the detection information, and controls the unmanned aerial vehicle 300 to capture the image of the specific detection region by the camera 350. The specific detection region is, for example, a region including a road. The specific detection region is, for example, a region including a building. The specific detection region may be a region including a river.

The unmanned aerial vehicle control unit 424 may identify an undetected region which is not detected by the detection device 116 by analyzing the detection information, and control the unmanned aerial vehicle 300 to capture the image of the undetected region by the camera 350. The undetected region is, for example, a region hidden under a shadow of an obstacle such as a building. The undetected region may be a region the detection of which can not be specifically performed by the detection device 116 as being affected by rain or the like.

The captured image reception unit 428 receives the captured image captured by the camera 350 from the unmanned aerial vehicle 300. The captured image reception unit 428 stores the received captured image in the storage unit 402.

The rescue method decision unit 430 decides a rescue method of rescuing the user 250 of the user terminal 200 based on the captured image received by the captured image reception unit 428. The rescue method decision unit 430 may decide the rescue method further based on the environment information of the location indicated by the location information of the user terminal 200 which is stored in the storage unit 402.

The rescue method decision unit 430 decides a movable object to be used to rescue the user 250, for example. The movable object is a car, a helicopter, a ship, or the like. The rescue method decision unit 430 decides, for example, a movement path to be used to rescue the user 250. The rescue method decision unit 430 decides, for example, a shelter to be used to rescue the user 250. The rescue method decision unit 430 decides, for example, a number of rescue workers who rescue the user 250. The rescue method decision unit 430 may decide a material to be used to rescue the user 250.

The rescue method decision unit 430 decides, for example, that the user 250 is to move on the movement path. In this case, the unmanned aerial vehicle control unit 424 may control the unmanned aerial vehicle 300 to lead the user 250.

The rescue method decision unit 430 may decide that the movable object is to move on the movement path. For example, the rescue method decision unit 430 decides that the movable object is to move on the movement path to transport the user 250 to a safe location. The rescue method decision unit 430 may decide that the movable object is to move on the movement path to deliver a material to a shelter.

The rescue method information transmission unit 432 transmits rescue method information indicating the rescue method decided by the rescue method decision unit 430. The rescue method information transmission unit 432 transmits the rescue method information to the user terminal 200 via the communication device 150, for example. The rescue method information transmission unit 432 may transmit the rescue method information to the rescue agencies 600.

The user terminal 200 prompts the user 250 to confirm the rescue method information through display output of the rescue method information received from the control device 400 on a display or through audio output thereof. The user 250 moves on the movement path or waits for arrival of the rescue workers according to the confirmed rescue method information.

The disaster situation identification unit 434 identifies a disaster situation of the detection area 126 detected by the detection device 116 based on the detection information received by the detection information reception unit 422. The disaster situation identification unit 434 identifies the disaster situation of the detection area 126 by analyzing the detection information received by the detection information reception unit 422, for example.

The disaster situation identification unit 434 identifies a disaster region which is devastated out of the detection area 126 detected by the detection device 116, for example. The disaster region is, for example, a severed road region where a road is severed. The disaster region is a cliff failure region where a cliff failure occurs. The disaster region is, for example, a river overflowing region where a river overflows. The disaster region is, for example, a ground liquefaction region where liquefaction of the ground occurs. The disaster region may be a fire region where a fire breaks out. The disaster situation identification unit 434 may identify a road traffic situation of the detection area 126 detected by the detection device 116. The disaster situation identification unit 434 identifies a traffic jam region where a traffic jam on a road occurs, for example.

The communication device control unit 410 may control the communication device 150 based on the disaster situation identified by the disaster situation identification unit 434. The communication device control unit 410 controls the communication device 150 such that, for example, the wireless communication area 122 is not formed in a region where the disaster situation does not satisfy a predetermined condition, but the wireless communication area 122 is formed in a region where the condition is satisfied. The condition is, for example, an identification as the disaster region by the disaster situation identification unit 434.

The image capturing decision unit 436 decides whether an image around the location indicated by the location information of the user terminal 200 which is received by the location information reception unit 414 is to be captured based on the disaster situation identified by the disaster situation identification unit 434. When the disaster situation of the location indicated by the location information of the user terminal 200 satisfies a predetermined condition, for example, the image capturing decision unit 436 decides that the image around the location is to be captured. The condition is, for example, that the location indicated by the location information of the user terminal 200 is included in the disaster region identified by the disaster situation identification unit 434. The unmanned aerial vehicle control unit 424 may control the unmanned aerial vehicle 300 in response to the decision by the image capturing decision unit 436 that the image around the location is to be captured.

A configuration may be adopted where the control device 400 does not include the movement control unit 408. In this case, the control device 400 may transmit the target point set by the target point setting unit 406 to an external device which controls the flying object 100. The external device controls the movement of the flying object 100 such that the flying object 100 moves to the target point received from the control device 400.

A configuration may be adopted where the control device 400 does not include the unmanned aerial vehicle control unit 424. In this case, the control device 400 may transmit the detection information received by the detection information reception unit 422 and the location information of the user terminal 200 which is received by the location information reception unit 414 to the external device which controls the unmanned aerial vehicle 300. The external device controls the unmanned aerial vehicle 300 to capture the image around the location indicated by the location information of the user terminal 200 by the camera 350 based on the received detection information.

Figure 3:
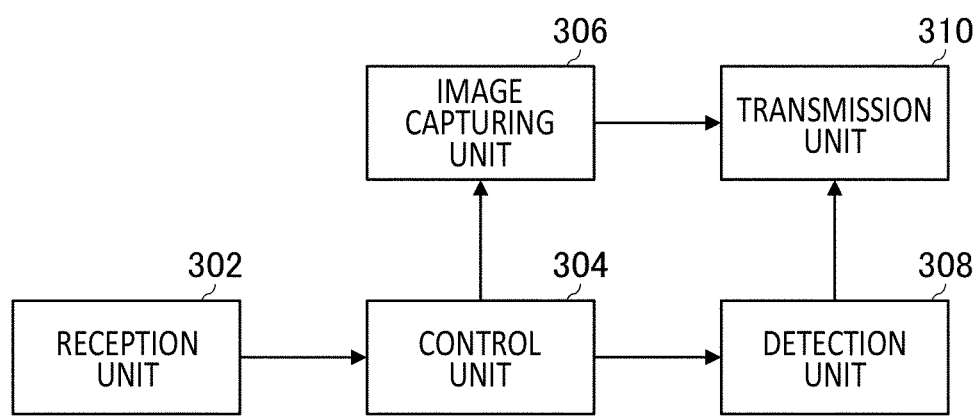
FIG. 3 schematically illustrates an example of a functional configuration of an unmanned aerial vehicle 300.

FIG. 3 schematically illustrates an example of a functional configuration of the unmanned aerial vehicle 300. The unmanned aerial vehicle 300 includes a reception unit 302, a control unit 304, an image capturing unit 306, a detection unit 308, and a transmission unit 310. Note that the unmanned aerial vehicle 300 does not necessarily include all of these components.

The reception unit 302 receives the unmanned aerial vehicle control information from the control device 400. The reception unit 302 receives the unmanned aerial vehicle control information from the control device 400 via the communication device 150, for example. The reception unit 302 may receive the unmanned aerial vehicle control information from the control device 400 via the communication satellite 60.

The control unit 304 controls the unmanned aerial vehicle 300 according to the unmanned aerial vehicle control information received by the reception unit 302. For example, the control unit 304 controls the movement of the unmanned aerial vehicle 300 to move to the location indicated by the location information of the user terminal 200. The control unit 304 controls the camera 350 to capture an image around the location in response to the movement to the location. The control unit 304 may control the unmanned aerial vehicle 300 to lead the user 250.

The image capturing unit 306 captures the image around the location indicated by the location information of the user terminal 200. The camera 350 may be an example of the image capturing unit 306.

The detection unit 308 detects a state around the location indicated by the location information of the user terminal 200. The detection unit 308 is, for example, a radar.

The transmission unit 310 transmits various types of information to the control device 400. The transmission unit 310 transmits the various types of information to the control device 400 via the communication device 150, for example. The transmission unit 310 may transmit the various types of information to the control device 400 via the communication satellite 60.

The transmission unit 310 transmits the captured image captured by the image capturing unit 306 to the control device 400, for example. The transmission unit 310 may transmit, to the control device 400, the detection information indicating the state around the location indicated by the location information of the user terminal 200 which is detected by the detection unit 308.

The captured image reception unit 428 may receive the detection information from the unmanned aerial vehicle 300. The rescue method decision unit 430 may decide a rescue method further based on the detection information received by the captured image reception unit 428 from the unmanned aerial vehicle 300.

Figure 4:
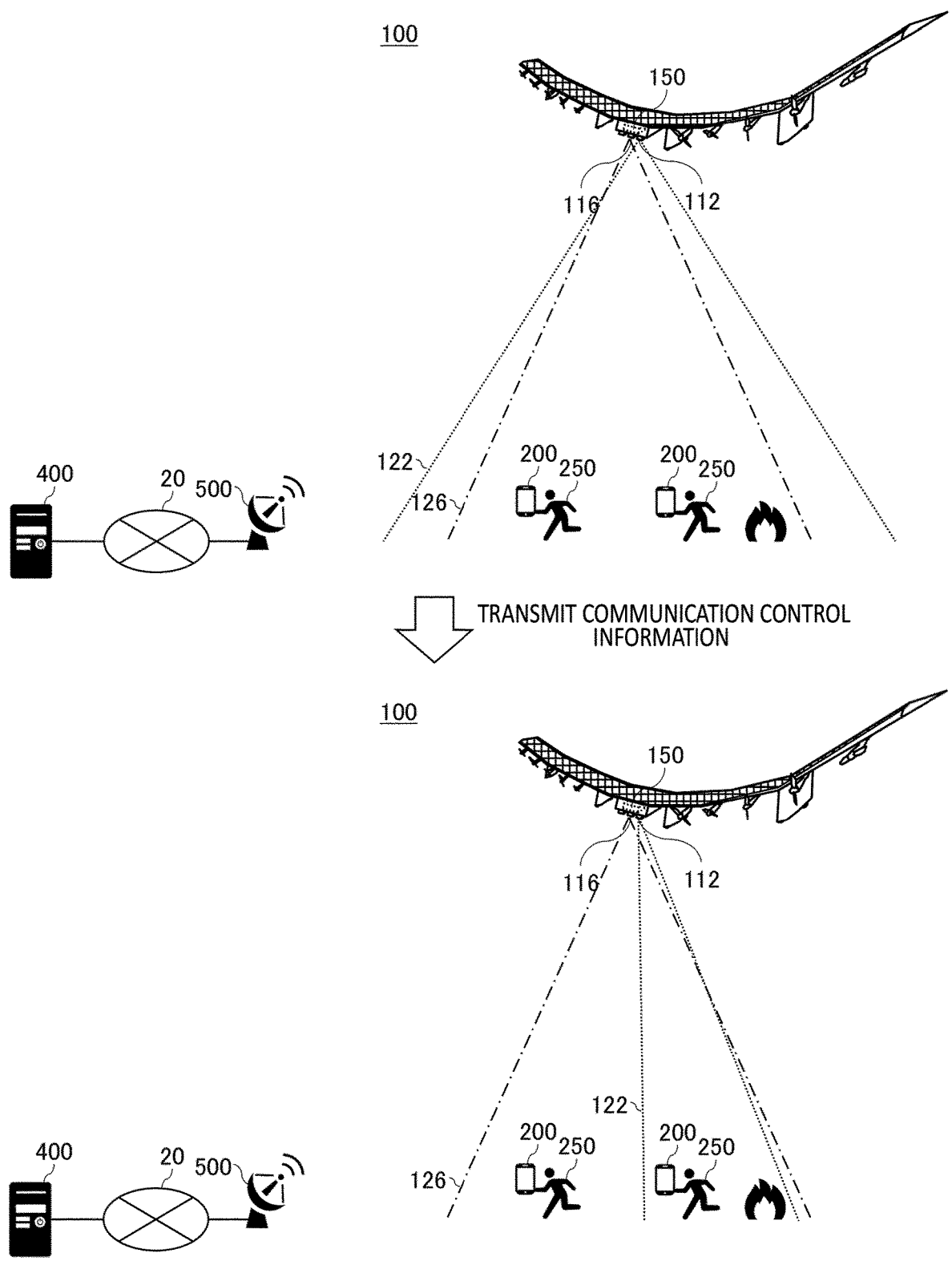
FIG. 4 is an explanatory diagram for describing processing of changing a wireless communication area 122 to be formed by a flying object 100.

FIG. 4 is an explanatory diagram for describing processing of changing the wireless communication area 122 to be formed by the flying object 100. Herein, a description will be provided of the processing in a case where the wireless communication area 122 is changed such that only a disaster region in the detection area 126 is set as the coverage objective based on a disaster situation of the detection area 126.

The disaster situation identification unit 434 identifies the disaster region in the detection area 126 based on the detection information indicating the state of the detection area 126 which is detected by the detection device 116. The communication device control unit 410 controls the communication device 150 such that only the disaster region identified by the disaster situation identification unit 434 is set as the coverage objective.

The communication device 150 controls the antenna 112 such that an irradiation range of the beam by the antenna 112 covers only the disaster region identified by the disaster situation identification unit 434 according to the control by the communication device control unit 410. For example, the communication device 150 controls a size of the irradiation range or an irradiation direction of one or more beams of the antenna 112 to cover only the disaster region. When the antenna 112 irradiates a plurality of beams, the communication device 150 may control the antenna 112 to stop beam with which the disaster region is not irradiated among the plurality of beams irradiated by the antenna 112. Thus, the communication device 150 carries out the change to the wireless communication area 122 where only the disaster region is set as the coverage objective.

In the processing illustrated in FIG. 4, the wireless communication area 122 is changed to the disaster region identified by the disaster situation identification unit 434. Thus, while the provision of the wireless communication service is maintained to the user terminals 200 in the disaster region where the prompt rescue is required, congestion of the network can be avoided by reducing a number of user terminals 200 which communicate with the communication device 150 via the service link.

FIG. 5 schematically illustrates an example of the unmanned aerial vehicle information. The unmanned aerial vehicle information of FIG. 5 includes waiting locations and performances of unmanned aerial vehicles A to H. Herein, a description will be provided of the processing in a case where the control device 400 selects an unmanned aerial vehicle which captures an image around the location indicated by the location information of the user terminal 200 from among the unmanned aerial vehicles A to H.

For example, the unmanned aerial vehicle control unit 424 selects an unmanned aerial vehicle which captures the image around the location indicated by the location information of the user terminal 200 from among unmanned aerial vehicles waiting in an airfield with a short distance between the location indicated by the location information of the user terminal 200 received by the location information reception unit 414 and the airfield. Herein, it is assumed that a distance between the location indicated by the location information of the user terminal 200 and an airfield a is shorter than a distance between the location indicated by the location information of the user terminal 200 and an airfield b. In this case, the unmanned aerial vehicle control unit 424 selects an unmanned aerial vehicle which captures the image around the location indicated by the location information of the user terminal 200 from among the unmanned aerial vehicles A to D.

Then, the unmanned aerial vehicle control unit 424 determines whether the distance between the location indicated by the location information of the user terminal 200 and the airfield a is longer than a predetermined distance. When the distance between the location indicated by the location information of the user terminal 200 and the airfield a is longer than the predetermined distance, the unmanned aerial vehicle control unit 424 selects an unmanned aerial vehicle which captures the image around the location indicated by the location information of the user terminal 200 from among unmanned aerial vehicles to which a large capacity battery is mounted. Herein, it is assumed that the distance between the location indicated by the location information of the user terminal 200 and the airfield a is longer than the predetermined distance. In this case, the unmanned aerial vehicle control unit 424 selects an unmanned aerial vehicle which captures the image around the location indicated by the location information of the user terminal 200 out of the unmanned aerial vehicles B and D.

Then, when a time period in which the image around the location indicated by the location information of the user terminal 200 is to be captured is a daytime, the unmanned aerial vehicle control unit 424 selects an unmanned aerial vehicle which captures the image around the location indicated by the location information of the user terminal 200 from among unmanned aerial vehicles to which an RGB camera is mounted. On the other hand, when the time period in which the image around the location indicated by the location information of the user terminal 200 is to be captured is a nighttime, the unmanned aerial vehicle control unit 424 selects an unmanned aerial vehicle which captures the image around the location indicated by the location information of the user terminal 200 from among unmanned aerial vehicles to which an infrared camera is mounted. Herein, it is assumed that the time period in which the image around the location indicated by the location information of the user terminal 200 is to be captured is a nighttime. In this case, the unmanned aerial vehicle control unit 424 selects the unmanned aerial vehicle D as the unmanned aerial vehicle which captures the image around the location indicated by the location information of the user terminal 200.

The unmanned aerial vehicle control unit 424 selects the unmanned aerial vehicle according to the distance between the location indicated by the location information of the user terminal 200 and the airfield or the time period in which the image around the location indicated by the location information of the user terminal 200 is to be captured. Thus, the captured image around the location indicated by the location information of the user terminal 200 can be collected by using the optimal unmanned aerial vehicle 300.

Figure 6:
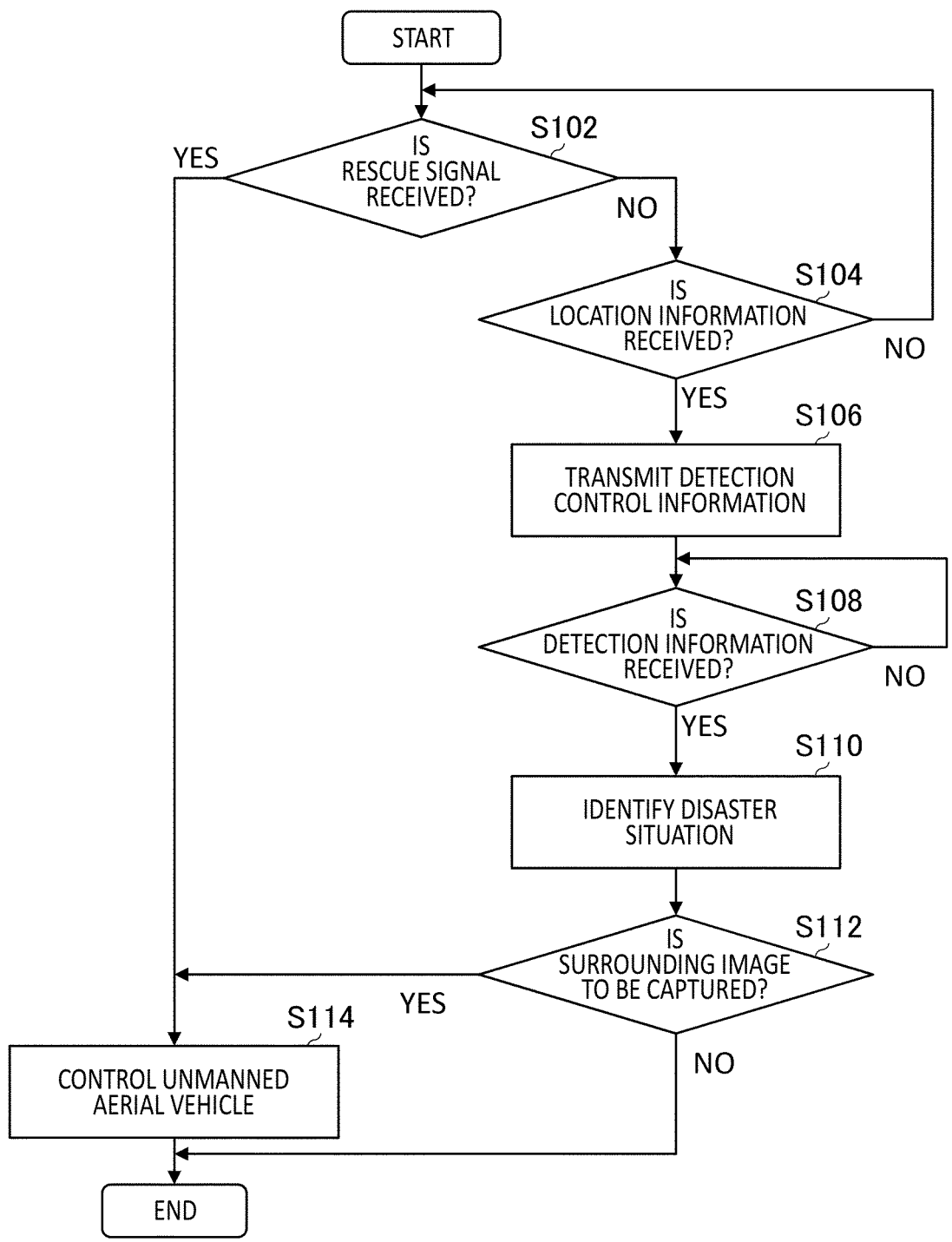
FIG. 6 schematically illustrates an example of a flow of processing by the control device 400.

FIG. 6 schematically illustrates an example of a flow of processing by the control device 400. In FIG. 6, a description will be provided where a state in which the flying object 100 provides the wireless communication service to the user terminal 200 is set as a start state.

In step (step may be abbreviated and described as S) 102, the control device 400 determines whether the location information reception unit 414 receives the rescue signal from the user terminal 200. When the location information reception unit 414 receives the rescue signal, the image capturing decision unit 436 decides that the image around the location indicated by the location information which is included in the rescue signal is to be captured, and the flow proceeds to S114. When the location information reception unit 414 does not receive the rescue signal, the flow proceeds to S104.

In S104, the control device 400 determines whether the location information reception unit 414 receives the location information of the user terminal 200 from the user terminal 200. When the location information reception unit 414 receives the location information of the user terminal 200, the flow proceeds to S106. When the location information reception unit 414 does not receive the location information of the user terminal 200, the flow returns to S102.

In S106, the detection device control unit 418 transmits the detection control information to the flying object 100. In S108, the control device 400 determines whether the detection information reception unit 422 receives, from the flying object 100, the detection information indicating the state of the detection area 126 which includes the location indicated by the location information of the user terminal 200. When the detection information reception unit 422 receives the detection information, the flow proceeds to S110.

In S110, the disaster situation identification unit 434 identifies a disaster situation of the detection area 126 based on the detection information received by the detection information reception unit 422. In S112, the image capturing decision unit 436 decides whether the image around the location indicated by the location information of the user terminal 200 which is received by the location information reception unit 414 is to be captured based on the disaster situation identified by the disaster situation identification unit 434. When the location is included in the disaster region, for example, the image capturing decision unit 436 decides that the image around the location is to be captured. When the image capturing decision unit 436 decides that the image capturing is to be performed, the flow proceeds to S114. When the image capturing decision unit 436 decides that the image capturing is not to be performed, the processing is ended.

In S114, the unmanned aerial vehicle control unit 424 controls the unmanned aerial vehicle 300 to capture the image around the location indicated by the location information of the user terminal 200. The captured image reception unit 428 receives a captured image from the unmanned aerial vehicle 300. The rescue method decision unit 430 decides a rescue method based on the captured image received by the captured image reception unit 428. Then, the processing is ended.

In the processing illustrated in FIG. 6, whether the image around the location indicated by the location information of the user terminal 200 is to be captured is decided according to the disaster situation identified by the disaster situation identification unit 434. Thus, the captured image around the location indicated by the location information of the user terminal 200 of the user 250 who requires the prompt rescue can be preferentially collected.

Figure 7:
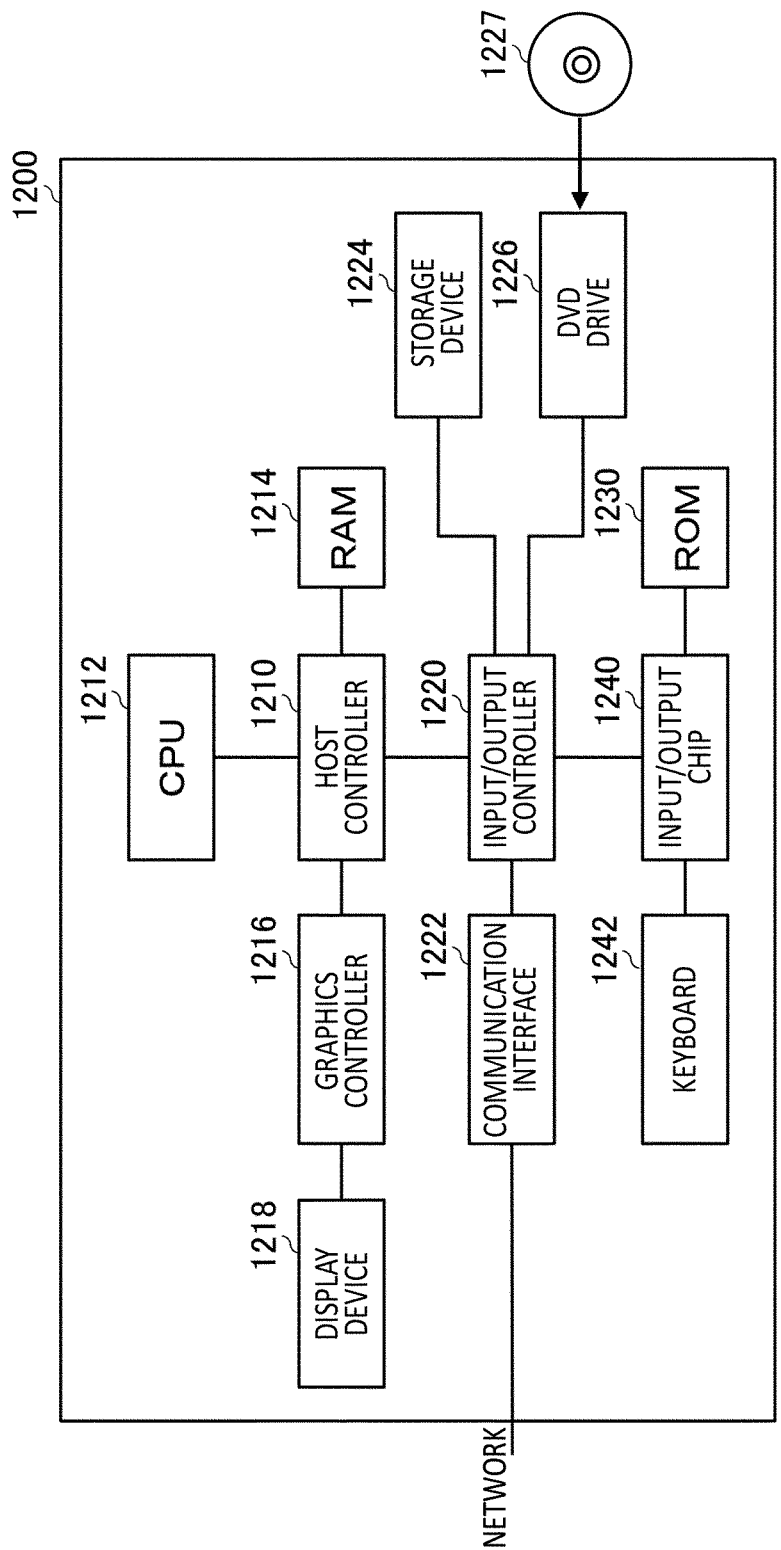
FIG. 7 schematically illustrates an example of a hardware configuration of a computer 1200 functioning as the control device 400.

FIG. 7 schematically illustrates an example of a hardware configuration of a computer 1200 that functions as the control device 400. Programs installed in the computer 1200 can cause the computer 1200 to function as one or more "units" of the device according to the present embodiment or can cause the computer 1200 to execute operations associated with the devices according to the present embodiment or the one or more "units", and/or can cause the computer 1200 to execute a process according to the present embodiment or steps of the process. Such a program may be executed by a CPU 1212 to cause the computer 1200 to perform particular operations associated with some or all of the blocks in the flowcharts and block diagrams described in the specification.

The computer 1200 according to the present embodiment includes the CPU 1212, a RAM 1214, and a graphics controller 1216, which are connected to each other via a host controller 1210. The computer 1200 also includes a communication interface 1222, a storage device 1224, a DVD drive 1226, and an input/output unit such as an IC card drive, which are connected to the host controller 1210 via an input/output controller 1220. The DVD drive 1226 may be a DVD-ROM drive, a DVD-RAM drive, and the like. The storage device 1224 may be a hard disk drive, a solid-state drive, and the like. The computer 1200 also includes legacy input/output units such as a ROM 1230 and a keyboard 1242, which are connected to the input/output controller 1220 through an input/output chip 1240.

The CPU 1212 operates according to the programs stored in the ROM 1230 and the RAM 1214, thereby controlling each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The DVD drive 1226 reads the programs or the data from the DVD-ROM 1227 or the like, and provides the storage device 1224 with the programs or the data. The IC card drive reads programs and data from an IC card and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port or the like to the input/output controller 1220.

A program is provided by a computer readable storage medium such as the DVD-ROM 1227 or the IC card. The program is read from the computer readable storage medium, installed into the storage device 1224, RAM 1214, or ROM 1230, which are also examples of a computer readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive 1226 (DVD-ROM 1227), the IC card, etc., and perform various types of processing on the data on the RAM 1214. Then, the CPU 1212 may write the processed data back in the external recording medium.

Various types of information such as various types of programs, data, tables, and databases may be stored in a recording medium and subjected to information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The programs or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of devices responsible for performing operations. A particular step and "unit" may be implemented by dedicated circuitry, programmable circuitry supplied along with a computer readable instruction stored on a computer readable storage medium, and/or a processor supplied along with the computer readable instruction stored on the computer readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer readable storage medium may include any tangible device capable of storing an instruction performed by an appropriate device, so that the computer readable storage medium having the instruction stored thereon constitutes a product including an instruction that may be performed in order to provide means for performing an operation specified by a flowchart or a block diagram. An example of the computer readable storage medium may include an electronic storage medium, a magnetic storage medium, an optical storage medium, an electromagnetic storage medium, or a semiconductor storage medium. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

The computer readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer readable instruction to provide means for performing operations specified by the flowchart or the block diagram. Examples of the processor include a computer processor, a processing unit, a microprocessor, a digital signal processor, a controller, a microcontroller, and the like.

While the present invention has been described by way of the embodiments, the technical scope of the present invention is not limited to the above described embodiments. It is apparent to persons skilled in the art that various alterations or improvements can be added to the above described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: core network; 40: Internet; 50: radio base station; 60: communication satellite; 100: flying object; 101: main wing portion; 102: main body portion; 104: propeller; 110: solar cell panel; 112: antenna; 114: antenna; 116: detection device; 122: wireless communication area; 126: detection area; 150: communication device; 200: user terminal; 250: user; 300: unmanned aerial vehicle; 302: reception unit; 304: control unit; 306: image capturing unit; 308: detection unit; 310: transmission unit; 350: camera; 400: control device; 402: storage unit; 404: deactivated base station information reception unit; 406: target point setting unit; 408: movement control unit; 410: communication device control unit; 414: location information reception unit; 416: environment information reception unit; 418: detection device control unit; 422: detection information reception unit; 424: unmanned aerial vehicle control unit; 428: captured image reception unit; 430: rescue method decision unit; 432: rescue method information transmission unit; 434: disaster situation identification unit; 436: image capturing decision unit; 500: gateway; 600: rescue agencies; 1200: computer; 1210: host controller; 1212: CPU; 1214: RAM; 1216: graphics controller; 1218: display device; 1220: input/output controller; 1222: communication interface; 1224: storage device; 1226: DVD drive; 1227: DVD-ROM; 1230: ROM; 1240: input/output chip; 1242: keyboard.

What is claimed is:

1. A control device comprising:
a location information reception unit which receives, via a communication device which is mounted to a flying object functioning as a stratospheric platform and forms a wireless communication area by beam irradiation to provide a wireless communication service to a user terminal in the wireless communication area, location information of the user terminal from the user terminal in the wireless communication area;
a detection device control unit which controls a detection device of the flying object to detect a state of a region including a location indicated by the location information;
a detection information reception unit which receives, via the communication device, detection information indicating the state of the region which is detected by the detection device;
an unmanned aerial vehicle control unit which controls an unmanned aerial vehicle to capture an image around the location indicated by the location information by an image capturing unit of the unmanned aerial vehicle based on the detection information received by the detection information reception unit;
a captured image reception unit which receives a captured image captured by the image capturing unit from the unmanned aerial vehicle; and
a rescue method decision unit which decides a rescue method of rescuing a user of the user terminal based on the captured image received by the captured image reception unit.

2. The control device according to claim 1, comprising a storage unit which stores environment information related to an environment of the location indicated by the location information, wherein
the rescue method decision unit decides the rescue method further based on the environment information stored in the storage unit.

3. The control device according to claim 2, wherein the rescue method decision unit decides a movable object to be used to rescue the user.

4. The control device according to claim 2, wherein the rescue method decision unit decides a movement path to be used to rescue the user.

5. The control device according to claim 2, comprising a disaster situation identification unit which identifies a disaster situation of the region based on the detection information received by the detection information reception unit, and comprising
a communication device control unit which controls the communication device not to form the wireless communication area in a region where the disaster situation identified by the disaster situation identification unit does not satisfy a predetermined condition, but to form the wireless communication area in a region where the condition is satisfied.

6. The control device according to claim 2, comprising a disaster situation identification unit which identifies a disaster situation of the region based on the detection information received by the detection information reception unit, and comprising
an image capturing decision unit which decides whether the image around the location indicated by the location information is to be captured based on the disaster situation identified by the disaster situation identification unit, wherein
the unmanned aerial vehicle control unit controls the unmanned aerial vehicle in response to decision by the image capturing decision unit that the image around the location indicated by the location information is to be captured.

7. The control device according to claim 2, comprising a rescue method information transmission unit which transmits rescue method information indicating the rescue method decided by the rescue method decision unit to the user terminal via the communication device.

8. The control device according to claim 1, wherein the rescue method decision unit decides a movable object to be used to rescue the user.

9. The control device according to claim 1, wherein the rescue method decision unit decides a movement path to be used to rescue the user.

10. The control device according to claim 9, wherein the unmanned aerial vehicle control unit controls the unmanned aerial vehicle to lead the user when the user moves on the movement path decided by the rescue method decision unit.

11. The control device according to claim 1, comprising a disaster situation identification unit which identifies a disaster situation of the region based on the detection information received by the detection information reception unit, and comprising
a communication device control unit which controls the communication device not to form the wireless communication area in a region where the disaster situation identified by the disaster situation identification unit does not satisfy a predetermined condition, but to form the wireless communication area in a region where the condition is satisfied.

12. The control device according to claim 1, comprising a disaster situation identification unit which identifies a disaster situation of the region based on the detection information received by the detection information reception unit, and comprising
an image capturing decision unit which decides whether the image around the location indicated by the location information is to be captured based on the disaster situation identified by the disaster situation identification unit, wherein
the unmanned aerial vehicle control unit controls the unmanned aerial vehicle in response to decision by the image capturing decision unit that the image around the location indicated by the location information is to be captured.

13. The control device according to claim 12, wherein
the location information reception unit receives a rescue signal including the location information of the user terminal from the user terminal, and
the image capturing decision unit decides that the image around the location indicated by the location information is to be captured when the location information reception unit receives the rescue signal.

14. The control device according to claim 1, comprising a rescue method information transmission unit which transmits rescue method information indicating the rescue method decided by the rescue method decision unit to the user terminal via the communication device.

15. The control device according to claim 1, wherein
the detection device includes an image capturing device,
the detection device control unit performs control to capture an image of the region by the image capturing device, and
the detection information reception unit receives a captured image captured by the image capturing device.

16. The control device according to claim 1, wherein
the detection device includes an SAR (Synthetic Aperture Radar),
the detection device control unit controls the SAR to detect the state of the region, and
the detection information reception unit receives the detection information indicating the state of the region which is detected by the SAR.

17. The control device according to claim 1, wherein the control device is mounted to the flying object.

18. A program which causes a computer to function as:
a location information reception unit which receives, via a communication device which is mounted to a flying object functioning as a stratospheric platform and forms a wireless communication area by beam irradiation to provide a wireless communication service to a user terminal in the wireless communication area, location information of the user terminal from the user terminal in the wireless communication area;
a detection device control unit which controls a detection device of the flying object to detect a state of a region including a location indicated by the location information;
a detection information reception unit which receives, via the communication device, detection information indicating the state of the region which is detected by the detection device;
an unmanned aerial vehicle control unit which controls an unmanned aerial vehicle to capture an image around the location indicated by the location information by an image capturing unit of the unmanned aerial vehicle based on the detection information received by the detection information reception unit;
a captured image reception unit which receives a captured image captured by the image capturing unit from the unmanned aerial vehicle; and
a rescue method decision unit which decides a rescue method of rescuing a user of the user terminal based on the captured image received by the captured image reception unit.

19. A system comprising:
a control device; and
a flying object functioning as a stratospheric platform, wherein
the control device has
a location information reception unit which receives, via a communication device which is mounted to the flying object and forms a wireless communication area by beam irradiation to provide a wireless communication service to a user terminal in the wireless communication area, location information of the user terminal from the user terminal in the wireless communication area, a detection device control unit which controls a detection device of the flying object to detect a state of a region including a location indicated by the location information, a detection information reception unit which receives, via the communication device, detection information indicating the state of the region which is detected by the detection device, an unmanned aerial vehicle control unit which controls an unmanned aerial vehicle to capture an image around the location indicated by the location information by an image capturing unit of the unmanned aerial vehicle based on the detection information received by the detection information reception unit, a captured image reception unit which receives a captured image captured by the image capturing unit from the unmanned aerial vehicle, and a rescue method decision unit which decides a rescue method of rescuing a user of the user terminal based on the captured image received by the captured image reception unit.

20. A method executed by a computer, the method comprising:

receiving, via a communication device which is mounted to a flying object functioning as a stratospheric platform and forms a wireless communication area by beam irradiation to provide a wireless communication service to a user terminal in the wireless communication area, location information of the user terminal from the user terminal in the wireless communication area;

controlling detection by controlling a detection device of the flying object to detect a state of a region including a location indicated by the location information;

receiving, via the communication device, detection information indicating the state of the region which is detected by the detection device;

controlling an unmanned aerial vehicle to capture an image around the location indicated by the location information by an image capturing unit of the unmanned aerial vehicle based on the detection information received in the receiving the detection information;

receiving a captured image captured by the image capturing unit from the unmanned aerial vehicle; and deciding a rescue method of rescuing a user of the user terminal based on the captured image received in the receiving the captured image.

* * * * *